US008359223B2

(12) United States Patent
Chi et al.

(10) Patent No.: US 8,359,223 B2
(45) Date of Patent: Jan. 22, 2013

(54) INTELLIGENT MANAGEMENT OF VIRTUALIZED RESOURCES FOR CLOUD DATABASE SYSTEMS

(75) Inventors: Yun Chi, Monte Sereno, CA (US); Hyun Jin Moon, Newark, CA (US); V. Hakan Hacigumus, San Jose, CA (US); Pengcheng Xiong, Cupertino, CA (US); Shenghuo Zhu, Cupertino, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 79 days.

(21) Appl. No.: 12/985,021

(22) Filed: Jan. 5, 2011

(65) Prior Publication Data
US 2012/0022910 A1 Jan. 26, 2012

Related U.S. Application Data

(60) Provisional application No. 61/365,965, filed on Jul. 20, 2010.

(51) Int. Cl.
G06Q 10/00 (2006.01)
G06F 15/18 (2006.01)
G06N 5/02 (2006.01)
(52) U.S. Cl. ..................... 705/7.22; 705/7.25
(58) Field of Classification Search .......... 705/7.12, 705/7.22, 7.25, 317, 412; 1/1; 370/352; 706/52; 709/228; 712/163
See application file for complete search history.

(56) References Cited

U.S. PATENT DOCUMENTS

| 8,019,697 | B2* | 9/2011 | Ozog | 705/412 |
| 2005/0174995 | A1* | 8/2005 | Tovinger | 370/352 |
| 2006/0230160 | A1* | 10/2006 | Dinkel et al. | 709/228 |
| 2008/0109343 | A1* | 5/2008 | Robinson et al. | 705/37 |
| 2008/0313160 | A1* | 12/2008 | Hellerstein et al. | 707/3 |
| 2009/0187526 | A1* | 7/2009 | Salle et al. | 706/52 |
| 2011/0022812 | A1* | 1/2011 | van der Linden et al. | 711/163 |
| 2011/0119104 | A1* | 5/2011 | Levine et al. | 705/7.25 |

OTHER PUBLICATIONS

P. Xiong, Z. Wang, G. Jung and C. Pu, "Study on performance management and application behavior in virtualized environment", Proc. of the 12th Network Operation and Management Symposium (NOMS 2010), Apr. 2010, Osaka, Japan.
X. Zhu, Z. Wang and S. Singhal, "Utility-driven workload management using nested control design," Proc. of American Control Conference (ACC), Jun. 2006.

* cited by examiner

*Primary Examiner* — Jason Dunham
*Assistant Examiner* — Gerald Vizvary
(74) *Attorney, Agent, or Firm* — Joseph Kolodka (57) ABSTRACT

Systems and methods are disclosed to manage resources in a cloud-based computing system by generating a model of a relationship between cloud database resources and an expected profit based on cloud-server system parameters and service level agreements (SLAs) that indicates profits for different system performances, wherein the model comprises a two level optimization/control problem, wherein model receives system metrics, number of replicas, and arrival rate as the multiple input; and dynamically adjusting resource allocation among different customers based on current customer workload and the expected profit to maximize the expected profit for a cloud computing service provider.

19 Claims, 4 Drawing Sheets

INTELLIGENT MANAGEMENT OF VIRTUALIZED RESOURCES FOR CLOUD DATABASE SYSTEMS

The present invention claims priority to Provisional Application Ser. No. 61/365,965 filed Jul. 20, 2010, the content of which is incorporated by reference.

BACKGROUND

The present invention relates to resource management for cloud database systems.

The cloud computing model is changing how the technology solutions are accessed and consumed by the users. The infrastructure resources and computing capabilities are provided as a service to the users by the cloud providers. The users can leverage a range of attractive features, such as resource elasticity, cost efficiency, and ease of management. The cloud computing model also compels the rethinking of economic relationships between the provider and the users based on the cost and the performance of the services. In a cloud computing environment, resources are shared among different clients. Intelligently managing and allocating resources among various clients is important for system providers, whose business model relies on managing the infrastructure resources in a cost-effective manner while satisfying the client service level agreements (SLAs).

Cloud-based data management services, which are typically as part of Platform-as-a-Service (PaaS) offerings, is one of the most significant components of the new model. In PaaS, service providers generate the revenue by serving the client queries where the revenue is determined by the delivery SLAs. In order to provide such service, the PaaS providers may rent their resources from Infrastructure-as-a-Service (IaaS) providers by paying for the resource usage. Hence, from a PaaS provider point of view, the profit is determined by two factors: revenue and cost.

PaaS providers may have two different types of problems: (1) management of big data by scale-out and (2) consolidation of many small data for cost efficiency. With the former, they need to find the right scale to meet the SLA of a single client, e.g., how many machines are needed to serve a given workload. In this paper, we focus on the latter, a.k.a. multi-tenant databases, where the service provider looks for the opportunity of cost reduction through tenant consolidation.

In multitenant databases, there are several different levels of sharing, including private virtual machine (VM), private database, private table, and shared table.

In a private virtual machine, each tenant database runs in its own virtual machine. This level of sharing allows users to explicitly control the system resources allocated for each VM, or the corresponding tenant. The current virtualization technologies allow packing of a large number of VMs into physical machines thereby increasing the cost efficiency of infrastructure resources. While it seems quite attractive to consolidate multiple tenants into a physical machine, it requires careful planning and management in order to satisfy tenants' SLAs.

Figure 1:
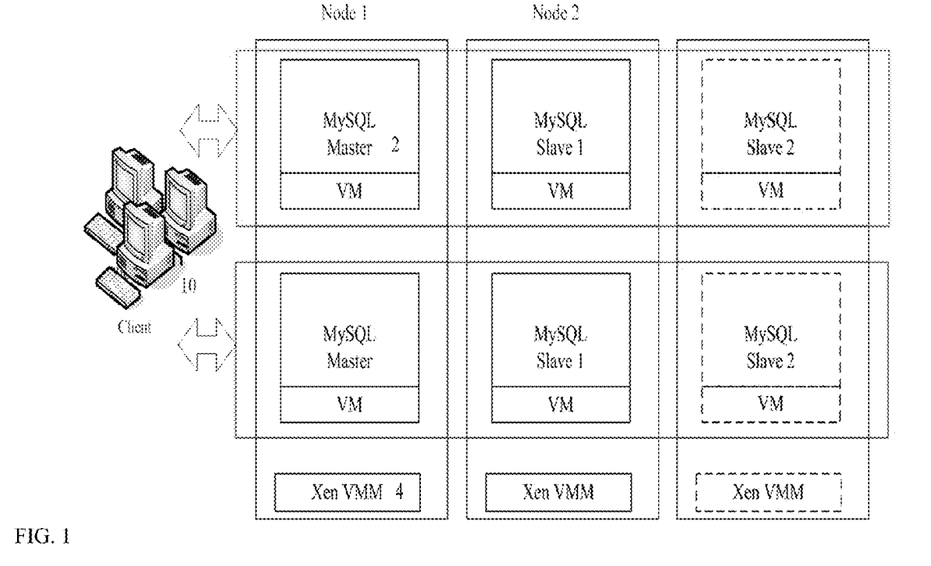
FIG. 1 shows an illustrative exemplary database services in a cloud environment.

FIG. 1 shows an illustrative exemplary database services in a cloud environment. In this example, the cloud database service provider services clients 10 such as a gold client and a silver one. The cloud computers includes nodes 1, 2, . . . N. Each node includes a plurality of database virtual machines 2 and a virtual machine manager 4. As their workload demand changes, they add or remove database slaves. The clients share the hardware resources where master and slaves are contained in a separate VM which is common in many web applications hosted on large clusters. The service provider charges an agreed-upon fee if it delivers the service by meeting the SLAs and pays a penalty if it fails to meet the SLAs. Consequently, a failure to deliver on SLAs results in higher penalty for the gold client. In reality, of course, there may be more than two kinds of clients.

Most existing resource management strategies are focused on system-level metrics such as queue delay time. In addition, existing techniques lack a feedback process to update the model of the system under management. In addition, most of the work is done manually by relying on the human expertise, which is neither sustainable nor scalable.

SUMMARY

In one aspect, systems and methods are disclosed to manage resources in a cloud-based computing system by generating a model of a relationship between cloud database resources and an expected profit based on cloud-server system parameters and service level agreements (SLAs) that indicates profits for different system performances, wherein the model comprises a two level optimization/control problem, wherein model receives system metrics, number of replicas, and arrival rate as the multiple input; and dynamically adjusting resource allocation among different customers based on current customer workload and the expected profit to maximize the expected profit for a cloud computing service provider.

In another aspect, the system includes a modeling module, which mainly answers Local Analysis questions, and a resource allocation decision module, which answers Global Analysis questions. The system modeling module uses machine learning techniques to learn a model that describes the potential profit margins for each client under different resource allocations. Based on the learned model, the resource allocation decision module dynamically adjusts the system resource allocations in order to optimize expected profits.

In a further aspect, machine learning techniques are applied to learn a system performance model through a data-driven approach. The model explicitly captures relationships between the systems resources and database performance. Based on the learned predictive model, an intelligent resource management system is used which considers many factors in cloud computing environments such as SLA cost, client workload, infrastructure cost, and action cost in a holistic way.

Advantages of the preferred embodiments may include one or more of the following. The system efficiently performs virtual resource management for database systems in cloud environments. Benefits of the system include improving the profit margins for a service provider of a cloud computing system, improving user experiences, and providing suggestions for capacity planning. The system generates accurate predictive models under different hardware resource allocations, such as CPU and memory, as well as database specific resources, such as the number of replicas in the database systems. The system can provide intelligent service differentiation according to factors such as variable workloads, SLA levels, resource costs, and deliver improved profit margins. The allocation of system resources such as CPU share, memory share, database replicas, among others, can be tuned in real time in order to maximize the profit for a service provider. The system achieves optimal resource allocation in a dynamic and intelligent fashion. The intelligent resource management system greatly improves the profit margins of cloud service providers. The cloud database provider has two main goals: (1) meeting the client SLAs and (2) maximizing its own profits. It is obvious that intelligent management of the resources is crucial for the service provider to achieve these goals. The service provider should intelligently allocate limited resources, such as CPU and memory, among competing clients. On the other hand, some other resources, although not strictly limited, have an associated cost. Database replication is such an example. Adding additional database replicas not only involves direct cost (e.g., adding more nodes), but also has initiation cost (e.g., data migration) and maintenance cost (e.g., synchronization). The system intelligently manages resources in a shared cloud database system by considering Local and Global Analysis policies:

Local Analysis: The first issue is to identify the right configuration of system resources (e.g., CPU, memory among others.) for a client to meet the SLAs while optimizing the revenue. Answers to such a question are not straightforward as they depend on many factors such as the current workload from the client, the client-specific SLAs, and the type of resources.

Global Analysis: The second issue that a service provider has to address is the decision on how to allocate resources among clients based on the current system status. For example, how much CPU share or memory should be given to the gold clients versus the silver clients, when a new database replica should be started, among others. Answers to such decisions obviously rely on the result of the above Local Analysis decisions.

The system efficiently performs virtual resource management for database systems in cloud environments. Machine learning techniques are applied to learn a system performance model through a data-driven approach. The model explicitly captures relationships between the systems resources and database performance. Based on the learned predictive model, an intelligent resource management system, SmartSLA, is used which considers many factors in cloud computing environments such as SLA cost, client workload, infrastructure cost, and action cost in a holistic way. The system achieves optimal resource allocation in a dynamic and intelligent fashion. The intelligent resource management system greatly improves the profit margins of cloud service providers.

BRIEF DESCRIPTION OF THE DRAWINGS

FIG. 3A shows an exemplary revenue function, while

DESCRIPTION

Figure 2:
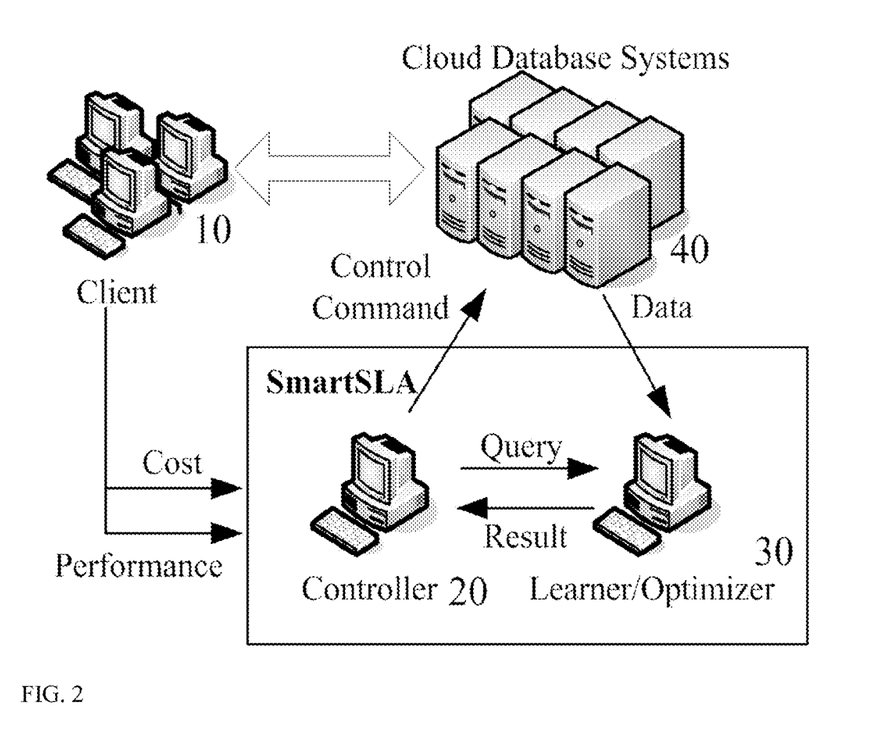
FIG. 2 shows an exemplary system for managing virtualized resources in a cloud-computing system.

FIG. 2 shows an exemplary system for managing virtualized resources in a cloud-computing system. A plurality of clients 10 request services from one or more cloud database systems with servers 40. The system of FIG. 2 includes a controller 20 that communicates with a learner/optimizer 30. The controller 20 in turn commands the servers 40 to optimize resource management for the cloud servers in accordance with service level agreement (SLA) profit optimization.

One server implementation uses MySQL v5.0 with InnoDB storage engine as the database server and use the built-in MySQL replication functionality for scale-out solution. In MySQL, replication enables data from one MySQL database server (the master) to be replicated to one or more MySQL database servers (the slaves). Replication is asynchronous and as a consequence, slaves need not to be always connected to the master in order to receive updates from the master. Each part of the MySQL replication (either master or slave) is hosted in one Xen virtual machine.

One implementation called SmartSLA (Resource Management for Resource-Sharing Clients based on Service Level Agreements), is a cost-aware resource management system. The system is monitored continuously by the SmartSLA manager and the resource allocations can be changed periodically in each time interval. The SmartSLA manager contains two modules. The first one is a system modeling module, which learns a model for the relationship between the resource allocation and expected cost for a single client. The second one is a resource allocation module, which dynamically makes decisions on the changes of the resource allocation among clients.

Figure 3A:
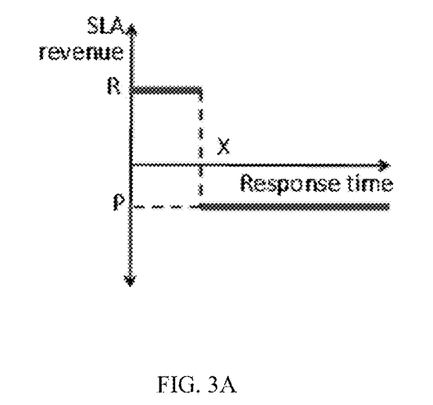

SLAs are contracts between a service provider and its clients. SLAs in general depend on certain chosen criteria, such as service latency, throughput, availability, security, among others. Service latency, or response time, are important SLA parameters. While SLA cost function may have various shapes, a staircase function is a more natural choice used in the real-world contracts as it is easy to describe in natural language. FIG. 3A shows such a single step function example. If the response time of the query q is shorter than $X_q$, then the service provider obtains a revenue R. Otherwise, the service provider pays a penalty P back to the client.

Figure 3B:
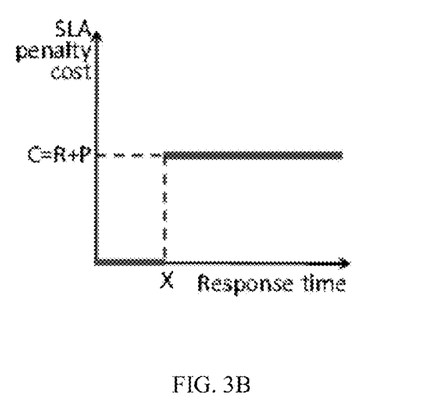
FIG. 3B shows an exemplary penalty cost function for SLAs.

From the given SLA revenue function, the SLA penalty cost function is shown in FIG. 3B. The service provider has been already paid R in advance and if the query q's response time is later than $X_q$, the service provider will pay R+P back to the client. With this relationship, SLA revenue maximization is equivalent to SLA penalty cost minimization. The start time and the response time of query q are denoted a start and $q_{start}$ and $q_{time}$, respectively, and R+P=1. The SLA penalty cost of query q then becomes $$P(q) = \begin{cases} 0 & \text{if } q_{time} \leq X_q \\ 1 & \text{otherwise} \end{cases}$$

The average SLA penalty cost AC is the sum of SLA penalty cost over the total number of queries L, i.e., $$AC = \frac{1}{L}\sum_q P(q).$$

For example, if the client sends 10 queries and 5 of them miss the deadline, then the sum of SLA penalty cost is 5 and the average SLA penalty cost is 0.5.

The database service provider's goal is to maximize its profits while satisfying the client SLAs. Therefore, the SLA penalty cost is the main metric to be optimized.

The system intelligently manages the resources in a shared cloud database system with a cost-aware resource management system. The system consists of two main components: the system modeling module and the resource allocation decision module. The system modeling module uses machine learning techniques to learn a model that describes the potential profit margins for each client under different resource allocations. Based on the learned model, the resource allocation decision module dynamically adjusts the resource allocations in order to achieve the optimum profits.

Figure 4:
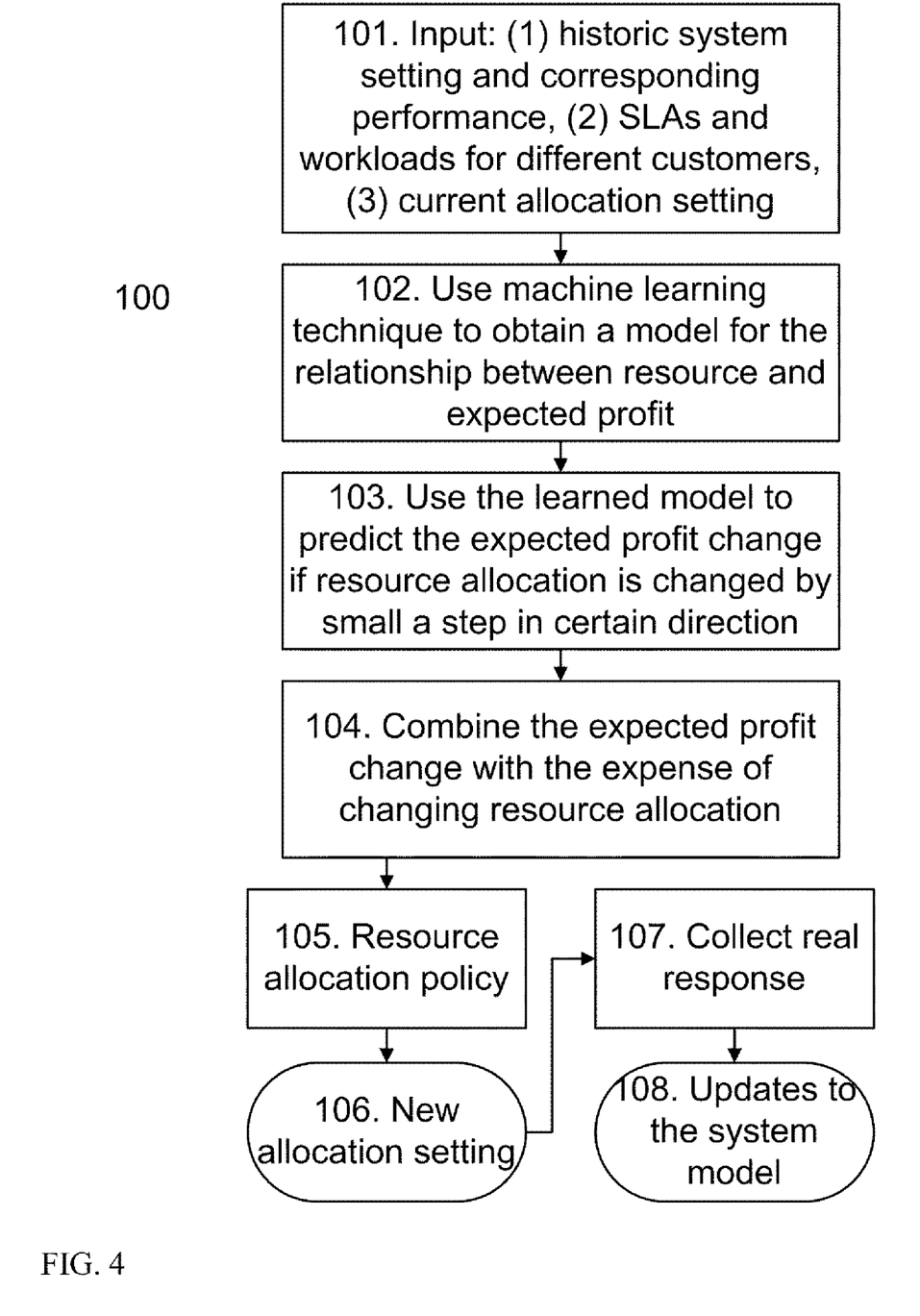
FIG. 4 shows an exemplary method to optimize virtual resource allocation.

FIG. 4 shows an exemplary method to optimize virtual resource allocation. In 101, the method receives inputs with three parts. The first part is the historic observations, including different system setting as well as the corresponding performance. The second part is the service level agreements and current workloads from different customers. The third part is the current setting of resource allocation. In 102, the method applies machine learning techniques to learn a model that describes for each customer the relationship between (potentially) allocated resources and the corresponding profit rewards. In 103, the method applies the model learned from 102 to predict what the expected profit change will be if the current system allocation is changed by small steps in each of the possible directions. Next, in 104, the process combines the profit changes predicted in 103 with the cost involved in the change of resource allocation, such as the impact on user experience, the data migration cost, among others. In 105, the method decides new resource allocations based on the information obtained in 104. Next, in 106, the new system allocation is generated in 105. In 107, the system collects actual performance obtained under the new resource allocation and in 108 updates the system model to improve the accuracy in modeling the relationship between the system resource allocation and the expected profit.

Next, the system modeling module in SmartSLA is described. The system identifies the system performance correlated with the system configuration in terms of SLA cost. More specifically, the service provider wants to know how the system performance would change (under an appropriate cost model) if the resource allocation is changed. The system performance is predictable by using the given features with the statistical analysis. However, some features such as memory size affects the system performance in a nonlinear manner. In addition, we expect that the features affect the system performance in a joint fashion, e.g., CPU is the main bottleneck only when the memory size is large enough.

To accurately predict the system performance, machine learning techniques are used to build adaptive models to precisely predict system performance under different resource allocations. The advantage of machine learning techniques is that they are data-driven, i.e., the resulting models may be different for different systems, but the modeling process is the same.

Various machine learning techniques can be used. A linear regression model can be used, but the accuracy turns out to be unsatisfactory, because of the nonlinear relationship between the cost and some of the resources, as shown in the previous section. A regression tree model can be used which takes the nonlinearity into account. In another embodiment, a boosting approach, called additive regression method, uses regression tree as the underlining weak learner. Regression methods can be implemented in an application called WEKA package so that WEKA modules can apply machine learning techniques to virtualized resource management. Before building the models, a data-preprocessing procedure normalizes the parameters to the same data range (from 0 and 1). Therefore, the magnitudes of all coefficients of the model are comparable.

One embodiment uses linear regression to fit data to a linear model. The result is a function describing the relationship between the input parameters (the normalized CPU share, memory size, number of database replicas, request rate) and the output (the average SLA penalty cost), where the mean-squared error is to be minimized. The linear model learned by linear regression is as follows:

$$AverageSLApenaltycost = f(cpu, mem, \#replicas, rate)$$
$$= -0.5210 \times cpu - 0.5392 \times mem -$$
$$0.1319 \times \#replicas + 0.1688 \times$$
$$rate + 0.9441,$$

where in the formula, cpu, mem, #replicas and rate represent normalized CPU shares, memory size, number of database replicas and arrival rate, respectively.

The linear regression assumes that the parameters (resource allocation) affect the output (average cost) in a linear fashion. To address nonlinearity, the entire parameter spaces are partitioned into several regions, where linear regression is performed locally in each region. A regression tree partitions the parameter space in a top-down fashion, and organizes the regions into a tree style. The tree is constructed by recursively splitting the data points along the optimal partition of a single variable to maximize the residual reduction. To reduce the generalization error, a pruning is performed to reduce the size of the tree. An M5P regression tree module can be used for the partitioning.

To further reduce the prediction error, a boosting approach iteratively obtains weak learners (namely, learners that do not necessarily have good performance individually), and combines the weak learners to create a strong learner which reduces the error. A boosting approach called additive regression can be used, and regression trees described above can be used as weak learners.

A series of mature, but increasingly more sophisticated, machine learning techniques can be used to obtain a system model that can accurately predict the system performance under different resource allocations. The magnitude of absolute error for the model is partly due to the complex system state space. For example, the running time of queries is not necessarily deterministic based only on CPU share and memory share. Concretely, the queries that belong to the same query type (e.g., Search Request) may have different cardinality and also different running neighbors in the run time.

Given a predictive, the system intelligently makes decisions on resources to minimize the total SLA cost. The resource allocation can be resolved into two levels. Resources on the first level, such as CPU share and memory size, have fixed capacity when the number of database replicas is fixed. In such a case, the decision is simply on how to optimally split the resources among clients who share the resources. Resources on the second level, such as number of database replicas, are expandable. That is, for example, the service provider can add additional database replicas, at certain prices, if doing so can reduce the total SLA cost.

For multiple clients sharing resources, the system considers N classes of clients instead of a single one. For the i-th class of clients the system uses an SLA penalty cost function $P(q,i)$ which depends on the deadline $X_q^i$. For the i-th class of clients, a weight $w(i)$ denotes the penalty when query q misses the deadline. For example, with gold, silver, and bronze clients, then the deadlines for them are $X_q^g$, $X_q^s$ and $X_q^b$, respectively and the SLA penalty costs for them are $w^g$, $w^s$ and $w^b$, respectively.

The weighted SLA penalty cost function as:

$$P_w(q,i) = P(q,i) \times w(i)$$

Within the k-th interval, the average SLA penalty cost for the i-th class of clients is the total SLA penalty cost over the total number of queries L(i,k) during the interval.

$$AC(i, k) = \frac{1}{L(i, k)} \sum_{T \times (k-1) \leq q_{start} < T \times k} P(q, i)$$

Given that there are N classes of clients, the total weighted SLA penalty cost for the k-th interval is $$SLA(k) = \sum_{i=1}^{N} \sum_{T \times (k-1) \leq q_{start} < T \times k} P_w(q, i)$$
$$= \sum_{i=1}^{N} AC(i, k) \times L(i, k) \times w(i).$$

The system minimizes the total weighted SLA penalty cost under the constraints on resources.

From the system model previously discussed, for a given workload (measured in real time) and the corresponding SLAs from the clients, theoretically we are able to find an optimal resource allocation that offers the minimum expected SLA cost. However, such a theoretical solution is very difficult to find. Recall that the system model we learned is a highly non-linear one (it consists of weighted sum of several regression trees, where each regression tree cuts the feature space into several regions). With such a non-linear model, which may have many local minimums, finding a globally optimal solution is challenging. Therefore in SmartSLA, a grid based search is used where the grids for CPU are separated every 5 shares and those for memory size are separated every 5 MB. When the previous time interval ends, SmartSLA decides the optimal direction for each client.

In one embodiment, a 3-D array, i.e., $d_i=[d_{i1}, d_{i2}, d_{i3}]$ is used to denote the direction for the i-th client. The first two dimensions, i.e., $d_{i1}$ and $d_{i2}$ denote the directions for CPU and Memory tuning respectively, which belong to the first-level resource allocation. The third dimension $d_{i3}$ is used for replica tuning, which belongs to the second-level resource allocation. We use $D=[d_1, d_2, \ldots, d_N]$ to denote the global decision. Since the clients share the machines, the third direction is $D_3=d_{13}=d_{23}=\ldots=d_{N3}$ and M(k) is the number of replicas during the k-th interval for all the clients as they share the machines; cpu(i,k), mem(i,k) and L(i,k) are defined as the cpu shares, memory shares and rate (workload) for the i-th class of clients during the k-th interval.

The system allocates system resources to minimize the total SLA penalty cost as follows. $f_i$ is the model that is learned by machine learning techniques according to different SLA penalty costs for the i-th client, then $$nextdirection = \underset{D}{\operatorname{argmin}} SLA(k)$$

$$\text{s.t. } SLA(k) = \sum_{i=1}^{N} AC(i, k) \times L(i, k) \times w(i)$$

$$AC(i, k) = f_i(cpu(i, k-1) + d_{i1}, mem(i, k-1) + d_{i2},$$
$$M(k-1), L(i, k))$$

$$\sum_{i=1}^{N} d_{i1} = 0, \sum_{i=1}^{N} d_{i2} = 0 \tag{1}$$

$$D_3 = d_{13} = d_{23} = \ldots = d_{N3} = 0 \tag{2}$$

For example, for the i-th client, the previous CPU and memory are cpu(i,k−1) and mem(i,k−1), e.g., 30 shares and 512 MB respectively. If the direction is $d_{i1}$=10 and $d_{i2}$=−100, then the next CPU and memory for this client are 40 shares and 412 MB respectively. Since the number of machines to use for the replicas is fixed, for the third direction $d_{13}=d_{23}=\ldots=d_{N3}=0$. Every term in the optimization can be calculated or obtained except L(i,k), which denotes the rate for the i-th client, and in one embodiment, L(i,k)=L(i,k−1).

Next, the second level resource allocation, i.e., how to tune the number of database replicas to reduce the total cost, is addressed. In this allocation, the total cost includes not only the SLA penalty cost but also the infrastructure and action costs. The action of tuning the number of database replicas is different from tuning CPU share and memory size, because it involves additional cost models.

In certain embodiments, the overheads of additional database replicas, such as data synchronization, never outpace the further SLA cost reduction brought by the additional replicas. Therefore, the system always operates with maximum number of allowable database replicas. In reality, however, additional database replicas come with costs, which can be due to infrastructure cost (e.g., adding more nodes) or initiation cost (e.g., data migration). A practical resource management system should take such costs into consideration.

From a service provider's point of view, infrastructure cost may involve many factors: hardware, software, DBA expenses, electricity bills, among others. For example, the price table from Amazon Relational Database Service shows that they adopt a simple linear model between the infrastructure cost and the number of machines. If c is the cost per node per interval and I(k) is proportional to the number of database replicas M(k) as I(k)=c×M(k), then the infrastructure cost for direction D can be calculated as I(k)=I(k−1)+c×$D_3$.

Including such an infrastructure cost, the target function becomes $$nextdirection = \underset{D}{\operatorname{argmin}} SLA(k) + I(k)$$

$$\text{s.t. } SLA(k) = \sum_{i=1}^{N} AC(i, k) \times L(i, k) \times w(i)$$

$$AC(i, k) = f_i(cpu(i, k-1) + d_{i1}, mem(i, k-1) + d_{i2},$$
$$M(k-1) + D_3, L(i, k))$$

$$\sum_{i=1}^{N} d_{i1} = 0, \sum_{i=1}^{N} d_{i2} = 0$$

$$I(k) = I(k-1) + c \times D_3$$

$$D_3 = d_{13} = d_{23} = \ldots = d_{N3} \in \{-1, 0, 1\}$$

One implementation chooses $D_3 \in \{-1, 0, 1\}$ as the system should add/remove at most one replica during one interval.

Figure 5:
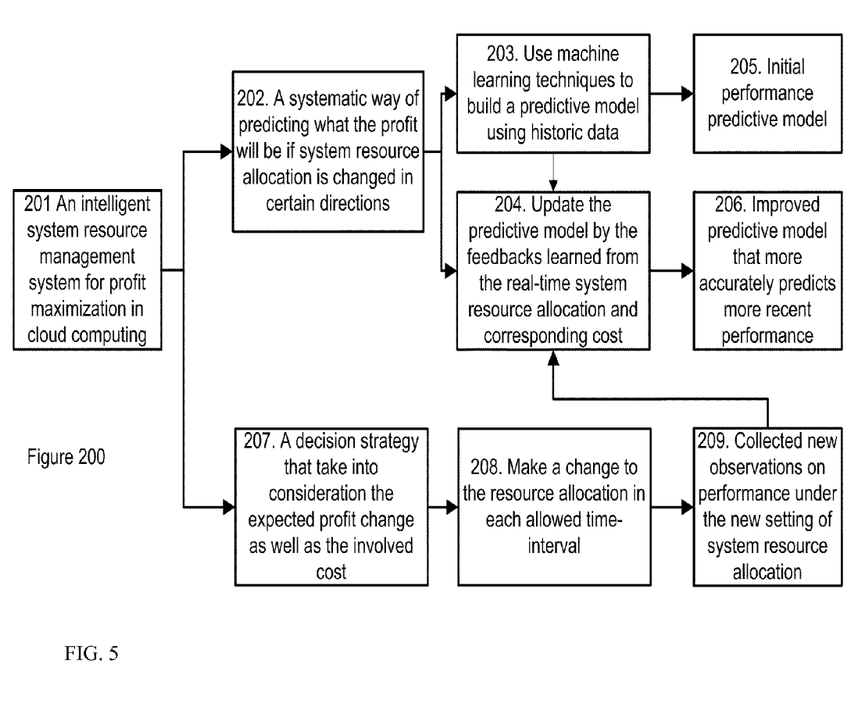
FIG. 5 shows an exemplary system for intelligently manage the system resource to maximize the expected profit for a service provider in cloud computing.

FIG. 5 shows an exemplary system 201 for intelligently manage the system resource to maximize the expected profit for a service provider in cloud computing. The system includes a module 202 providing a systematic way of predicting what the profit will be under different system resource allocations, and a decision module 207 to make decisions on the predictive model as well as the cost involved in the change of resource allocation. A module 203 applies machine learning techniques to build a predictive model to answer "what-if" questions about potential profit gain under different system resource allocations. A module 204 provides an update method that refines the predictive model by using more recent observation obtained in real time. Based on machine learning module 203, a module 205 obtains an initial performance predictive model that predict under any resource allocation, what the expected profit will be. Based on the feedback rule from module 204, a module 206 updates the predictive model by using more recently observed real-time data to make the model more accurate and more up-to-date.

The output of module 207 drives a decision strategy that considers the expected profit and the expense for making the corresponding change in system resource allocation in module 208. The decision made by (207) on the new settings of resource allocation. From module 308, module 309 obtains new observations by recording what really happened after the change on system resource allocation.

The system efficiently performs virtual resource management for database systems in cloud environments. Machine learning techniques are applied to learn a system performance model through a data-driven approach. The model explicitly captures relationships between the systems resources and database performance. Based on the learned predictive model, an intelligent resource management system, Smart-SLA, is used which considers many factors in cloud computing environments such as SLA cost, client workload, infrastructure cost, and action cost in a holistic way. SmartSLA achieves optimal resource allocation in a dynamic and intelligent fashion. The intelligent resource management system greatly improves the profit margins of cloud service providers.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer with digital signal processing capability to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer-implemented method to manage resources in a cloud-based computing system, comprising:
   a. generating by a processor a model of a relationship between cloud database resources and a predicted profit based on cloud-server system parameters and service level agreements (SLAs) that indicates profits for alternate system performances, wherein the model comprises a two level optimization and control problem and wherein model receives system metrics, number of replicas, and arrival rate as inputs; and
   b. dynamically adjusting by a processor a system resource allocation among alternate customers based on current customer workload and the predicted profit to maximize the expected profit for a cloud computing service provider while conforming to the SLA requirements.

2. The computer-implemented method of claim 1, comprising predicting the profit under alternate system resource allocations.

3. The computer-implemented method of claim 1, comprising building a predictive model to determine a potential profit gain under alternate system resource allocations.

4. The computer-implemented method of claim 1, comprising obtaining an initial performance predictive model that predicts the predicted profit under a predetermined resource allocation.

5. The computer-implemented method of claim 1, comprising updating the predictive model with feedbacks learned from a real-time system resource allocation and a corresponding cost.

6. The computer-implemented method of claim 1, comprising generating a decision strategy that considers the predicted profit and an expense for making a change in the system resource allocation.

7. The computer-implemented method of claim 1, comprising changing the system resource allocation in each allowed time-interval.

8. The computer-implemented method of claim 1, comprising collecting new observations on performance under a new setting of system resource allocation.

9. The computer-implemented method of claim 1, comprising:
   determining with a processor a weighted SLA penalty cost function as:

$$P_w(q,i) = P(q,i) \times w(i)$$

where within the k-th interval, an average SLA penalty cost for the i-th class of clients is a total SLA penalty cost over the total number of queries L(i,k) during the interval, where P represents a penalty cost function and w represents a weight function;
determining an average cost function AC as:

$$AC(i, k) = \frac{1}{L(i, k)} \sum_{T \times (k-1) \leq q_{start} < T \times k} P(q, i);$$

determining a total weighted SLA penalty cost for the k-th interval and N classes of clients as:

$$SLA(k) = \sum_{i=1}^{N} \sum_{T \times (k-1) \leq q_{start} < T \times k} P_w(q, i)$$

$$= \sum_{i=1}^{N} AC(i, k) \times L(i, k) \times w(i); \text{ and}$$

minimizing the total weighted SLA penalty cost under the constraints on resources.

10. The computer-implemented method of claim 1, comprising:
   a. predicting the profit under alternate system resource allocations;
   b. building a predictive model to determine potential profit gain under alternate system resource allocations;
   c. obtaining an initial performance predictive model that predicts the predicted profit under a resource allocation;
   d. updating the predictive model with feedbacks learned from a real-time system resource allocation and corresponding cost;
   e. generating a decision strategy that considers the expected profit and expense for making a change in the system resource allocation;
   f. changing the system resource allocation in each allowed time-interval; and
   g. collecting new observations on performance under a new setting of system resource allocation.

11. A system, comprising:
   a. a model generator to build a model of relationships between allocated resources and a predicted profit based on cloud-server system parameters and service level agreements (SLAs) that indicates profits for alternate system performances; and
   b. a dynamic control module coupled to the model generator, the dynamic control module adjusting resource allocations among alternate customers based on current customer workload and the predicted profit.

12. The system of claim 11, wherein the system parameter comprises CPU share, memory share, database replicas.

13. The system of claim 11, comprising means for predicting the profit under alternate system resource allocations.

14. The system of claim 11, comprising means for building a predictive model to determine potential profit gain under alternate system resource allocations.

15. The system of claim 11, comprising means for obtaining an initial performance predictive model that predicts the predicted profit under a resource allocation.

16. The system of claim 11, comprising means for updating the predictive model with feedbacks learned from a real-time system resource allocation and corresponding cost.

17. The system of claim 11, comprising means for generating a decision strategy that considers the predicted profit and expense for making a change in system resource allocation.

18. The system of claim 11, comprising:
   a processor for determining a weighted SLA penalty cost function as:

$$P_w(q\ i) = P(q,i) \times w(i)$$

where within the k-th interval, an average SLA penalty cost for the i-th class of clients is a total SLA penalty cost over the total number of queries L(i,k) during the interval, where P represents a penalty cost function and w represents a weight function;
   means for determining an average cost function AC as:

$$AC(i, k) = \frac{1}{L(i, k)} \sum_{T \times (k-1) \leq q_{start} < T \times k} P(q, i);$$

means for determining a total weighted SLA penalty cost for the k-th interval and N classes of clients as:

$$SLA(k) = \sum_{i=1}^{N} \sum_{T \times (k-1) \leq q_{start} < T \times k} P_w(q, i)$$

$$= \sum_{i=1}^{N} AC(i, k) \times L(i, k) \times w(i); \text{ and}$$

means for minimizing the total weighted SLA penalty cost under the constraints on resources.

19. A system, comprising:
   a. a model generator to build a model of relationships between allocated resources and a predicted profit based on cloud-server system parameters and service level agreements (SLAs) that indicates profits for alternate system performances; and
   b. a dynamic control module coupled to the model generator, the dynamic control module adjusting resource allocation among alternate customers based on current customer workload and the predicted profit
   c. means for predicting the profit under alternate system resource allocations;
   d. means for building a predictive model to determine potential profit gain under alternate system resource allocations;
   e. means for obtaining an initial performance predictive model that predicts the predicted profit under a resource allocation;
   f. means for updating the predictive model with feedbacks learned from a real-time system resource allocation and corresponding cost;
   g. means for generating a decision strategy that considers the predicted profit and expense for making a change in the system resource allocation;
   h. means for changing the system resource allocation in each allowed time-interval; and
   i. means for collecting new observations on performance under a new setting of system resource allocation.

* * * * *